United States Patent [19]

Everson, Jr.

[11] 4,012,173
[45] Mar. 15, 1977

[54] VARIABLE STROKE COMPRESSOR

[76] Inventor: Kirke B. Everson, Jr., 394 New Meadow Road, Barrington, R.I. 02806

[22] Filed: Jan. 26, 1976

[21] Appl. No.: 652,473

[52] U.S. Cl. .................. 417/259; 417/266; 417/488; 92/13.6; 92/60; 417/545

[51] Int. Cl.² .................. F04B 19/00; F04B 21/04; F04B 39/10; F01B 31/14

[58] Field of Search .......... 417/331, 253, 214, 261, 417/262, 265, 266, 267, 328, 487, 488, 545, 552, 553, 554, 244; 92/9, 60, 65, 13.6

[56] References Cited

UNITED STATES PATENTS

| 166,244 | 8/1875 | Bayliss | 417/540 |
|---|---|---|---|
| 744,611 | 11/1903 | Reeder | 92/65 |
| 905,640 | 12/1908 | Bochern | 417/261 |
| 2,575,937 | 11/1951 | Bent | 92/60 |
| 3,929,057 | 12/1975 | Kondo | 92/9 |

FOREIGN PATENTS OR APPLICATIONS

| 803,938 | 10/1936 | France | 417/488 |

Primary Examiner—Carlton R. Croyle
Assistant Examiner—Thomas I. Ross
Attorney, Agent, or Firm—Barlow & Barlow

[57] ABSTRACT

A variable stroke compressor is disclosed that includes a casing with an upper and lower piston, the lower piston being connected to a piston rod and the upper piston being slidably received for reciprocal movement on the piston rod. Means are provided on the upper piston to control its descent towards the lower piston.

4 Claims, 3 Drawing Figures

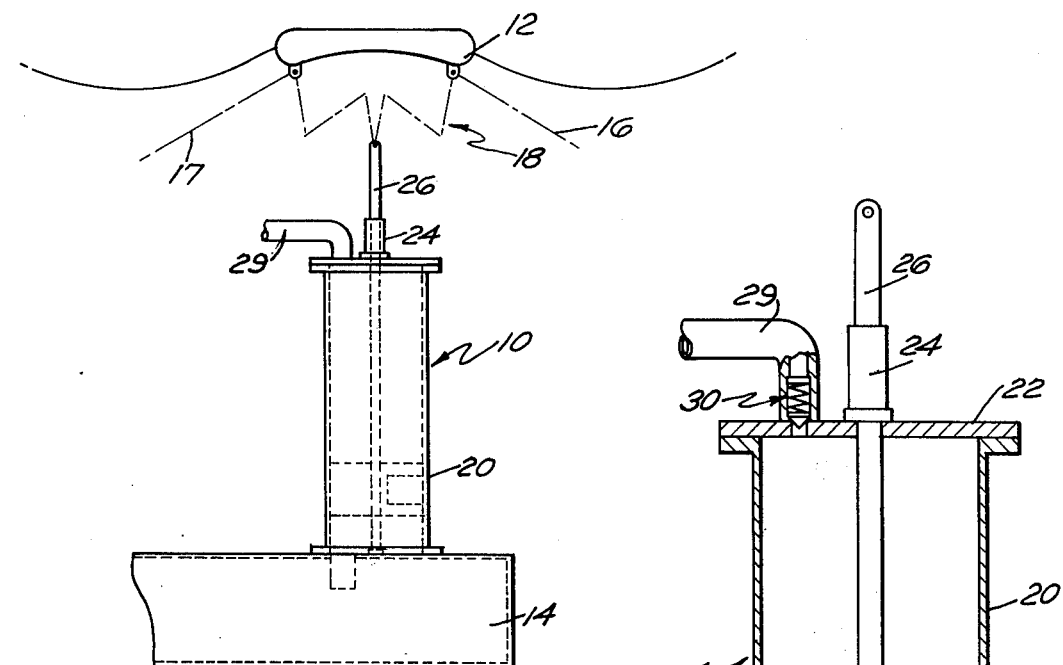
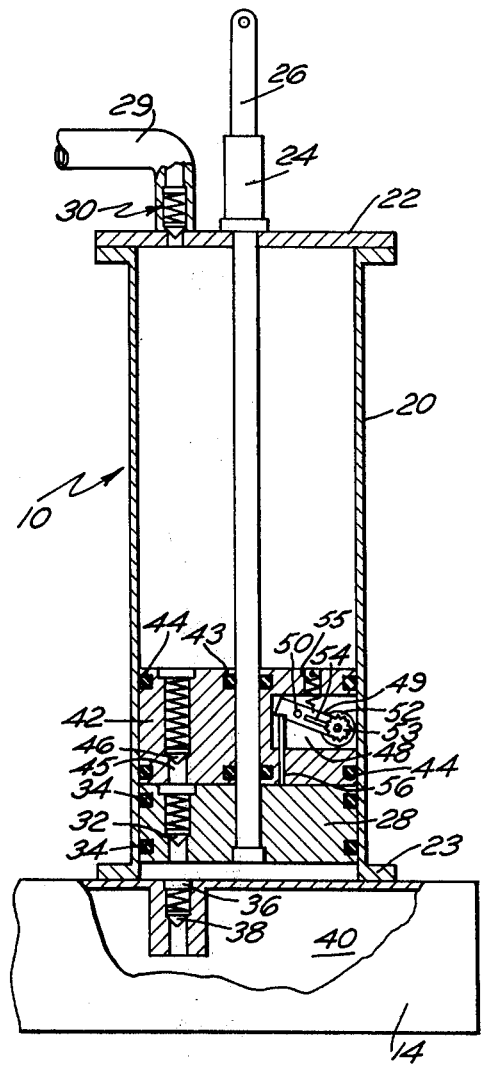
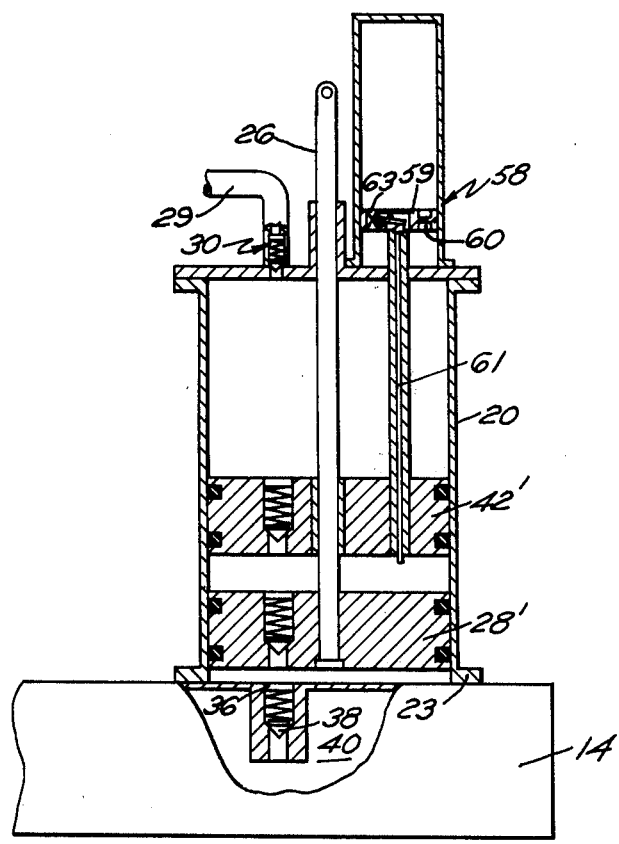

VARIABLE STROKE COMPRESSOR

BACKGROUND OF THE INVENTION

The utilization of wave motion or other erratic motion as a power source has long been recognized and any number of suggestions have been put forward as to how the energy might but put to practical use. One of the earlier concepts along these lines is illustrated in the Hansen patent 1,799,848 where a wave motor is disclosed in the form of a floating barge with pistons connected between it and the bottom. The main difficulty in the operation of this type of device is the fact that wave motion is not uniform and it will not produce uniform pressure outputs with standard piston compressors. Therefore, it is advantageous to utilize a novel design of a compressor where in effect the head of the compressor may be varied in distance from the main pumping piston so that uniform output pressures can be achieved in spite of the fact that varying strokes may be encountered.

SUMMARY OF THE INVENTION

The instant invention relates to a variable stroke compressor which is preferably driven by a floating barge that is suitably anchored and which may be connected to the piston rod of the compressor by cables or other flexible means so as to exert an upward pull thereon. It consists basically of a casing with substantially closed upper and lower ends with inlet ports adjacent the lower end and an outlet port adjacent the upper end with a piston rod and piston received therein for reciprocal movement by having the piston rod coupled to the flexible means that is connected to the float. Slidably received about the piston rod within the casing is an upper piston with means attached thereto to control its rate of movement within the casing and both the upper and lower pistons themselves are provided with one-way check valves to allow flow in an upward direction.

DESCRIPTION OF THE DRAWINGS

FIG. 1 is an elevational view partly schematic showing a variable stroke compressor made in accordance with the invention coupled to a float;

FIG. 2 is an enlarged view in vertical section of the compressor made in accordance with the invention;

FIG. 3 is a view of a slightly modified form of variable stroke compressor embodying the concept of the invention.

DESCRIPTION OF THE PREFERRED EMBODIMENT

Referring to FIG. 1, 10 generally designates a compressor made in accordance with the invention which is operatively connected to a wave powered driving apparatus designated 12. The compressor 10 is mounted on heavy anchor block 14 and, on this block 14, it should be understood that one or more compressors 10 may be mounted. The wave powered driving apparatus 12 can conveniently be a float that is anchored to the ocean floor by cables 16, 17 and which is coupled to the compressor by flexible cables generally indicated 18, such as, for instance, the piston rod of the compressor. The compressor 10, as will be seen referring to FIG. 2, comprises basically a casing 20 with an upper wall 22 and a lower wall 23 which close the compressor casing. The upper wall or end 22 is fitted with a guide bushing and packing 24 and through this extends a piston rod 26 which is connected to a lower piston 28. Also through the upper wall 22 is fitted an outlet conduit 29 and positioned in the entrance to the conduit is a check valve assembly, generally indicated at 30, which is suitable spring loaded to release on preset high pressure. The piston 28 is fitted with one or more low pressure check valves indicated at 32 and is provided with the usual packing as at 34. Through the lower end or bottom wall 23, there is provided an inlet port 36 which is fitted with a foot valve 38. In a preferred embodiment the anchor means 14 may be suitably provided with an open chamber generally designated 40 that will be connected to a source of air above the water.

The upper piston 42 is slidably received on the piston rod 26 with suitable sliding packing means as at 43 and with main casing packing means 44. Through the upper piston 42 a passage is provided at 45 and within this passage there is located a high pressure check valve 46. The wall of the upper piston is suitably cut out to provide a recess 48 and within this recess is located an arm 49 pivoted at 50, the arm carrying at its outer end a wheel 52 to which a ratchet 53 is attached with a suitable spring loaded detent 54. The arm is biased so that the wheel 52 is pressed against the inner wall of the casing 20 by means of a pull spring 55 and a release rod 56 slightly protrudes from the bottom wall of the upper piston.

Referring to FIG. 3 a slightly modified form if illustrated with identical parts except for the device retarding the downward movement of the upper piston. In lieu of the ratchet wheel, there is coupled to the upper piston 42' a descent control means for the upper piston designated 58. This is merely a hydraulic small piston 59 with an orifice means 60 to allow oil to flow from one side to the other of the piston 59 therewith within and serve in effect to retard the downward movement of the assemblage to a controlled rate. When the lower piston 28' engages the upper piston 42' a rod 61 actuates and opens a return valve diagrammed as 63 permitting rapid upward movement of both pistons.

OPERATION OF THE DEVICE

As has been generally described above, the float 12 is fastened to the piston rod 26 by cables 18 and with a wave rise, the piston rod 26 will be pulled upwardly pulling main piston 28 and upper piston 42 upwardly compressing any propellant or air that is trapped in the upper portion of the casing 20. If sufficient force is exerted, exhaust valve 30 will discharge through exhaust piping 29. During the upward movement of the lower piston 28 suction is created in the lower portion of the casing 20 opening foot valve 38 and permitting the lower portion of the compressor casing 20 to fill. Once tension is released on the pull cables 18, the weight of the main piston 28 will pull the same downward while the upper piston 42 will remain in its upward position with downward movement being exerted by a relatively higher pressure in the upper portion of casing 20. The friction means of the wheel 52 against the inner wall of the cylinder 20 or the means 58 retards and controls the descent. As the lower piston 28 descends, the check valve 32, which is a low pressure valve, will open and permit the propellant or air to pass through the main piston 28 and into the space now created between the upper piston and the lower piston. When the next wave comes along, the piston 28 will rise and the air or other propellant will be compressed between the upper piston 42 and the lower piston 28 until the same mean pressure is achieved between the upper part of the compressor and that between the two pistons at which time the valve 46 will open and the air or propellant will be driven into the upper part of the cylinder casing 20. This process will continue with the upper piston remaining substantially at a level that is dictated by the amount of stroke that is being imparted by the wave action so that the pressure developed by the device will be substantially constant although the stroke of the main piston may vary considerably.

It will be apparent that on occasion a large magnitude wave will raise the lower piston into contact with the upper piston. When this occurs, the release means consisting of either rod 56 or 61 will permit free travel of the upper piston with the lower piston without undue restraint, save for friction.

I claim:

1. A compressor comprising a casing with substantially closed upper and lower ends, an inlet port adjacent the lower end and an outlet port adjacent the upper end, a piston rod passing through the upper end, a packing sealing the rod and upper end yet permitting reciprocation thereof, a lower piston coupled to the piston rod, an upper piston slidably disposed on the rod, check valves in the upper and lower pistons permitting upward flow, means acting on the upper piston to retard reciprocable downward movement thereof in said casing, said piston rod coupled to a source of energy to reciprocate the rod and said lower piston.

2. A compressor as in claim 1 wherein the means to retard downward movement comprises a friction wheel mounted on said upper piston.

3. A compressor as in claim 2 wherein said friction wheel is mounted on a pivoting arm and the wheel is urged normally against the inner wall of the casing, and including means to release engagement of the wheel upon approach of the lower piston.

4. A compressor as in claim 1 wherein the means to retard downward movement comprises a hydraulic piston coupled to the upper piston, said piston having controlled leakage of hydraulic fluid therethrough.

* * * * *